Patented Mar. 10, 1953

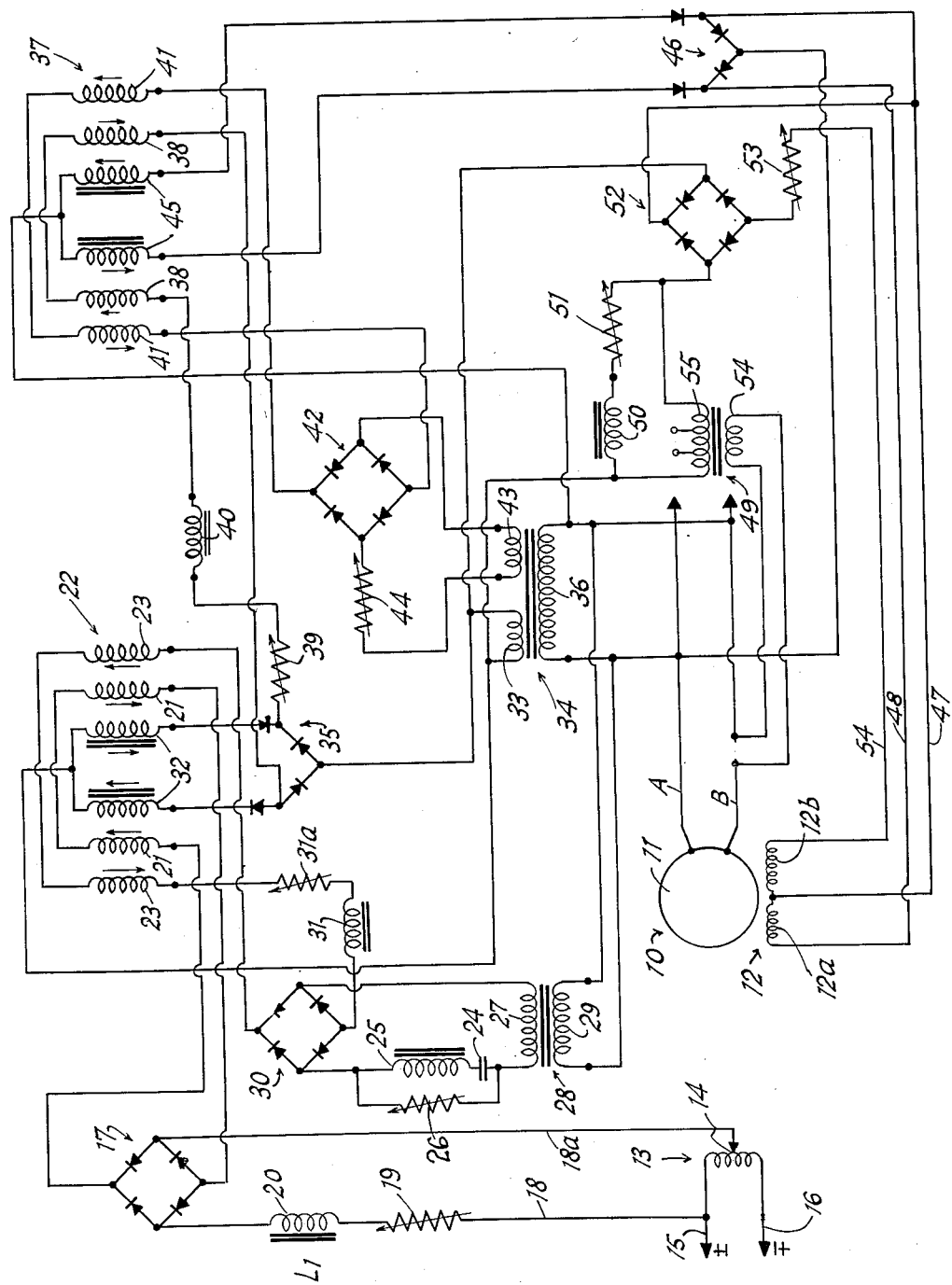

2,631,268

UNITED STATES PATENT OFFICE 2,631,268

VOLTAGE REGULATOR

David H. Ransom, Pines Lake, and Harold M. Miller, Upper Montclair, N. J., assignors to Bogue Electric Manufacturing Co., Paterson, N. J., a corporation of New Jersey Application March 13, 1951, Serial No. 215,286

3 Claims. (Cl. 322—20)

This invention relates to voltage regulators.

An object of this invention is to provide a voltage regulating system for an alternating current generator wherein a major portion of the regulation is derived from an improved field supply circuit and the remainder of the regulation is supplied by an improved magnetic amplifier circuit.

A further object of this invention is to provide in a voltage regulator including a magnetic amplifier circuit, means for sensing voltage changes at points distant from the generator and means for sensing frequency changes in the generator output, the output of the amplifier being regulated in accordance with such changes, the frequency and voltage sensing means being adapted to compensate each other when the output of the amplifier is modified in response to simultaneous changes in voltage and frequency.

Another object of this invention is to provide in a voltage regulator of the character described, an improved compound circuit responsive to changes in load current and power factor, to regulate the current input to the excitation circuit of the generator whereby to maintain the generator output at a given voltage.

Still another object of this invention is to provide in a generator having a field winding made up of a pair of series connected sections, a magnetic amplifier in circuit with one of the field sections together with means responsive to voltage and frequency changes for modifying the amplifier output, and a circuit of low impedance connected to the other field section and responsive to changes in load current and power factor for modifying the output thereof.

Other objects of this invention will in part be obvious and in part hereinafter pointed out.

The invention accordingly consists in the combination of elements and circuits embracing the same, which will be exemplified in the system hereinafter described, and of which the scope of invention will be indicated in the claims following.

In the drawing, the figure is a schematic showing of the circuit connections of a voltage regulator embodying the invention.

Referring in detail to the drawing, 10 designates a single phase alternating current generator which includes an armature 11 and a split field winding which is made up of a pair of series connected sections 12a, 12b.

The voltage regulator for the generator includes a voltage sensing circuit adapted to detect voltage changes at points distant from the generator. Such circuit includes an autotransformer 13 having a tap at 14. The input side of the transformer is adapted to be connected to points distant from the generator by means of leads 15, 16 to sense voltage changes at such points. The output of transformer 13 is supplied to the input side of a full wave rectifier 17 by means of a conductor 18 and a conductor 18a leading from tap 14. Interposed in conductor 18 is a series connected resistor 19 and an iron core inductor or reactor 20. The reactor 20 is adapted to become saturated at a predetermined voltage such as the voltage to be maintained, the current passing therethrough changing rapidly with small deviations from the predetermined voltage.

The output of rectifier 17 is supplied to a pair of series connected control windings 21 located on a suitable core of a saturable reactor 22. The reactor 22 also includes a pair of series connected control windings 23 which provide bias for the reactor. The input for windings 23 is supplied by a frequency discriminating circuit which comprises a series connected tuned condenser 24 and reactor 25, and a shut connected resistor 26, such circuit being connected in series with a secondary winding 27 of a potential transformer 28 whose primary winding 29 is connected across the output leads A, B of the generator 10. The output of such circuit is supplied to the input side of a full wave rectifier 30, whose output is connected to reactor windings 23 through a series connected reactor 31 and resistor 31a.

The reactor 22 further includes a pair of parallel connected alternating current windings 32 which are connected at their juncture to one side of a secondary winding 33 on a potential transformer 34, the other side of transformer winding 33 being connected to the input side of a full wave rectifier 35, which is also in circuit with windings 32.

The primary winding 36 of transformer 34 is connected across generator output leads A, B. The output of rectifier 35 provides a control current for a saturable reactor 37 which constitutes a second stage of amplification in relation to the first stage of amplification provided by the reactor 22.

The reactor 37 includes a suitable core provided with a pair of series connected control windings 38 in circuit with the output of rectifier 35 through a series connected resistor 39 and reactor 40; and a second pair of series connected control windings 41 which provide bias for the reactor. The current for windings 41 is supplied from the output side of a full wave rectifier 42 whose input is connected to the secondary winding 43 on transformer 34, through a control resistor 44.

The reactor 37 also includes a pair of parallel connected power windings 45 in circuit with a full wave rectifier 46. The windings 45 are connected at their juncture to generator output lead B, and through the input side of the rectifier 46, to generator output lead A. The output of rectifier 46 is connected to field winding section 12a through conductors 47, 48.

Means is provided for supplying field current which is proportional to load, voltage and power factor. Such means comprises a compound circuit interconnecting the generator output and field winding section 12b. Such circuit includes as components thereof, potential transformer 34, a current transformer 49, a reactor 50, a resistor 51, a full wave rectifier 52 and a current limiting resistor 53.

The current transformer 49 comprises a primary winding 54 inserted in generator output lead B and a secondary winding 55 which is shunted by the series connected reactor 50 and resistor 51. Such combination is connected in series with the secondary winding 33 of potential transformer 34 and across the input side of rectifier 52. The output of rectifier 52 is supplied through current adjusting resistor 53 to field winding section 12b through conductors 47, 54.

It will be apparent from a consideration of the figure, that the windings of reactor 22 are arranged so that the fluxes produced by windings 21, 32 are in the same direction, as indicated by the arrows and therefore in aiding relation. Furthermore, the fluxes produced by windings 21, 32, are opposite in direction to that produced by windings 23, as indicated by the arrows. Accordingly a positive input to winding 21 of reactor 22 will provide an increased reactor output while a negative input to the same winding will provide a decreased reactor output. With a positive input supplied to windings 23, the reactor output will be decreased and with a negative input supplied to the same windings, the reactor output will be increased.

In reactor 37, the flux of the power windings 45 is opposed by that of the control windings 38 and is aided by that of the control windings 41, as indicated by the arrows. Accordingly, a decreased input to reactor 37 will result in an increased output therefrom while an increased input will poduce a decreased output.

In operation, assuming that the voltage in leads A, B, at some point distant from generator 10, rises above normal operating voltage, then reactor 20 through transformer 13 will be operative to sense such rise and a control current is supplied to the first stage of amplification which results in an increased output from reactor 22 and a decreased output from the second stage of amplification. Accordingly, there will be supplied to the generator field 12 a decreased excitation current of an order such as to restore the sensing point voltage to a predetermined operating value. With a decrease in voltage at the sensing point, the reverse action takes place and the generator field will be supplied with an increased current sufficient to restore the voltage at the sensing point to the desired operating value.

In the event that the frequency of the generator output should vary from normal, thereby altering the output voltage, the reactor 25 and the condenser 24 which are tuned to a frequency below the normal operating frequency of the generator, will become operative to vary the bias effect produced in reactor 22 through windings 23 and thereby modify the output thereof. Thus, an increase in frequency would reduce the bias current and increase the output of the first stage of amplification and decrease the output of the second stage of amplification, thereby reducing the generator field excitation to restore the generator output voltage to its normal operating value. Conversely, a decrease in frequency will result in an increase in field excitation to restore voltage conditions to normal.

With a simultaneous change in voltage at the sensing point and in generator output frequency, the reactor 25 and condenser 24, which make up a series resonance circuit of low impedance at the resonant frequency, will compensate for the action of the voltage sensing reactor 20, which acts inversely to changes in frequency. Similarly, the resonance circuit acts inversely with respect to voltage changes and such action is compensated by means of the voltage sensing reactor 20. The resistor 26 may be adjusted to determine the amount of correction afforded by the resonance circuit for each incremental change in frequency. The reactor 31 and resistor 31a are adapted to regulate the input of bias current to windings 23 and thereby determine the input-output characteristic of the first stage of amplification.

With a variation in generator load, the compound circuit including the reactor 50, resistor 51 and current transformer 49, becomes operative to effect a major portion of the field excitation change required to maintain constant terminal voltage, directly through field winding section 12b. A minor portion of the field excitation change through field winding section 12a, is provided by means of the two stage magnetic amplifier 22, 37, in the manner previously described.

A change in power factor arising from a variation in the load, or the like, is effective to modify the output of the compound circuit. A voltage will be developed across the series connected reactor 50 and resistor 51 by reason of a current flowing in the secondary winding 55 of the current transformer 49 when the generator is supplying a load. Such voltage is shifted in time phase from the current in accordance with the characteristics of such circuit. The resultant of this voltage added vectorially with the voltage of secondary winding 33 of the potential transformer 34, is proportional to both the load current and the load power factor. Since the resultant voltage thus developed is applied to the input side of rectifier 52, the output thereof and hence the field current supplied to field winding section 12b is proportional to both load current and power factor.

The compound circuit is arranged so that with a load current lagging the load voltage, a decrease in power factor will give rise to an increase in current supplied to the generator field winding. Similarly, with a leading current, a decrease in power factor will give rise to a decrease in current supplied to the generator field winding.

The values of reactor 50 and resistor 51 are such as to be operative for powers factors between about 80% and 100% on the lagging and leading sides.

The input to the second stage of amplification is filtered by means of reactor 40. The current output of the compound circuit through rectifier 52, is adjusted by means of resistor 53.

It is apparent that in view of the major portion of the generator voltage correction being attained by means of the compound circuit, the magnetic amplifiers may be reduced in size and yet provide the final corrective in generator voltage regulation.

It will thus be seen that there is provided a voltage regulator in which the several objects of this invention are achieved.

As various possible embodiments might be made of the above described invention, and as various changes might be made in the embodiment set forth, it is understood that all matter herein set forth or shown in the accompanying drawing, is to be interpreted as illustrative and not in a limiting sense.

Having thus described our invention, we claim as new and desire to protect by Letters Patent:

1. An alternating current generator including a field winding having a pair of series connected sections, means for regulating the output voltage of said generator comprising a control circuit including interconnected saturable reactor means, voltage sensing means and frequency responsive means, said control circuit interconnecting the generator output and one of said field winding sections whereby to regulate the input to said field winding section, and means in circuit with the generator output and the other of said field winding sections responsive to changes in load and power factor for regulating the input to said other field winding section.

2. A generator as in claim 1, wherein said last mentioned means includes a potential transformer and a current transformer having their respective primary windings connected in circuit with the generator output, and a phase shifting circuit including a series connected reactor and resistor connected in parallel with the secondary winding of said current transformer, said phase shifting circuit being connected across the secondary winding of said potential transformer.

3. An alternating current generator including a field winding having a pair of series connected sections, means for regulating the operating output voltage of said generator comprising a first control circuit including saturable reactor means connected to one section of said field winding and a second control circuit connected to the other section of said field winding, said first control circuit including means responsive to voltage changes in the generator output at points distant from the generator and means responsive to frequency changes in the generator output for regulating the output of said saturable reactor means, said second control circuit including means responsive to changes in voltage, load and power factor to regulate the output of said control circuit.

DAVID H. RANSOM.
HAROLD M. MILLER.

REFERENCES CITED

The following references are of record in the file of this patent:

UNITED STATES PATENTS

| Number | Name | Date |
| --- | --- | --- |
| 1,710,755 | West | Apr. 30, 1929 |
| 2,386,040 | Edwards | Oct. 2, 1945 |
| 2,558,572 | Logan | June 26, 1951 |
| 2,571,827 | Bradley | Oct. 16, 1951 |